US009249787B2

(12) United States Patent
Gilarranz et al.

(10) Patent No.: US 9,249,787 B2
(45) Date of Patent: Feb. 2, 2016

(54) ADVANCED TOPOLOGIES FOR OFFSHORE POWER SYSTEMS

(75) Inventors: Jose L. Gilarranz, Katy, TX (US); Kenneth Devito, Houston, TX (US)

(73) Assignee: Dresser-Rand Company, Olean, NY (US)

( * ) Notice: Subject to any disclaimer, the term of this patent is extended or adjusted under 35 U.S.C. 154(b) by 502 days.

(21) Appl. No.: 13/521,792

(22) PCT Filed: Jan. 27, 2011

(86) PCT No.: PCT/US2011/022730
§ 371 (c)(1),
(2), (4) Date: Sep. 20, 2012

(87) PCT Pub. No.: WO2011/094414
PCT Pub. Date: Aug. 4, 2011

(65) Prior Publication Data
US 2013/0121846 A1    May 16, 2013

Related U.S. Application Data

(60) Provisional application No. 61/298,624, filed on Jan. 27, 2010.

(51) Int. Cl.
| | |
|---|---|
| *F04B 35/00* | (2006.01) |
| *F04B 17/03* | (2006.01) |
| *F04D 17/12* | (2006.01) |
| *F04D 25/02* | (2006.01) |
| *F04D 25/06* | (2006.01) |
| *F04D 27/02* | (2006.01) |
| *H02P 9/04* | (2006.01) |
| *H02J 3/00* | (2006.01) |
| *H02J 3/38* | (2006.01) |

(52) U.S. Cl.
CPC .............. *F04B 17/03* (2013.01); *F04D 17/12* (2013.01); *F04D 25/02* (2013.01); *F04D 25/0606* (2013.01); *F04D 27/0261* (2013.01); *H02J 3/00* (2013.01); *H02J 3/38* (2013.01); *H02P 9/04* (2013.01); *Y10T 307/25* (2015.04); *Y10T 307/305* (2015.04)

(58) Field of Classification Search
CPC ..... F04B 17/03; F04D 25/0606; F04D 25/02; F04D 27/0261; F04D 17/12; H02J 3/00; H02J 3/38; H02P 9/04
USPC ............................................. 417/34, 364, 411
See application file for complete search history.

(56) References Cited

U.S. PATENT DOCUMENTS

| | | | | |
|---|---|---|---|---|
| 4,319,329 | A * | 3/1982 | Girgis et al. ................... | 702/75 |
| 5,848,877 | A * | 12/1998 | Dill et al. ..................... | 417/44.2 |
| 7,161,257 | B2 * | 1/2007 | Lakov et al. ................. | 290/40 R |
| 7,642,756 | B2 * | 1/2010 | Ravera et al. ................. | 322/17 |
| 2002/0048179 | A1 * | 4/2002 | Nomiya et al. ................ | 363/50 |
| 2007/0131839 | A1 * | 6/2007 | Dunn et al. ................... | 248/637 |

FOREIGN PATENT DOCUMENTS

JP     2002047948 A * 2/2002

* cited by examiner

*Primary Examiner* — Charles Freay
(74) *Attorney, Agent, or Firm* — Edmonds & Nolte, PC

(57) ABSTRACT

A variable speed compression system that is driven by a variable frequency high speed motor that receives power from a high frequency generation unit that is driven by a high speed gas turbine is provided. The speed of the turbine may be varied to control the output frequency of the high frequency generation unit, thus controlling the output of the compression system by controlling the speed of the turbine driving the generation unit.

13 Claims, 1 Drawing Sheet

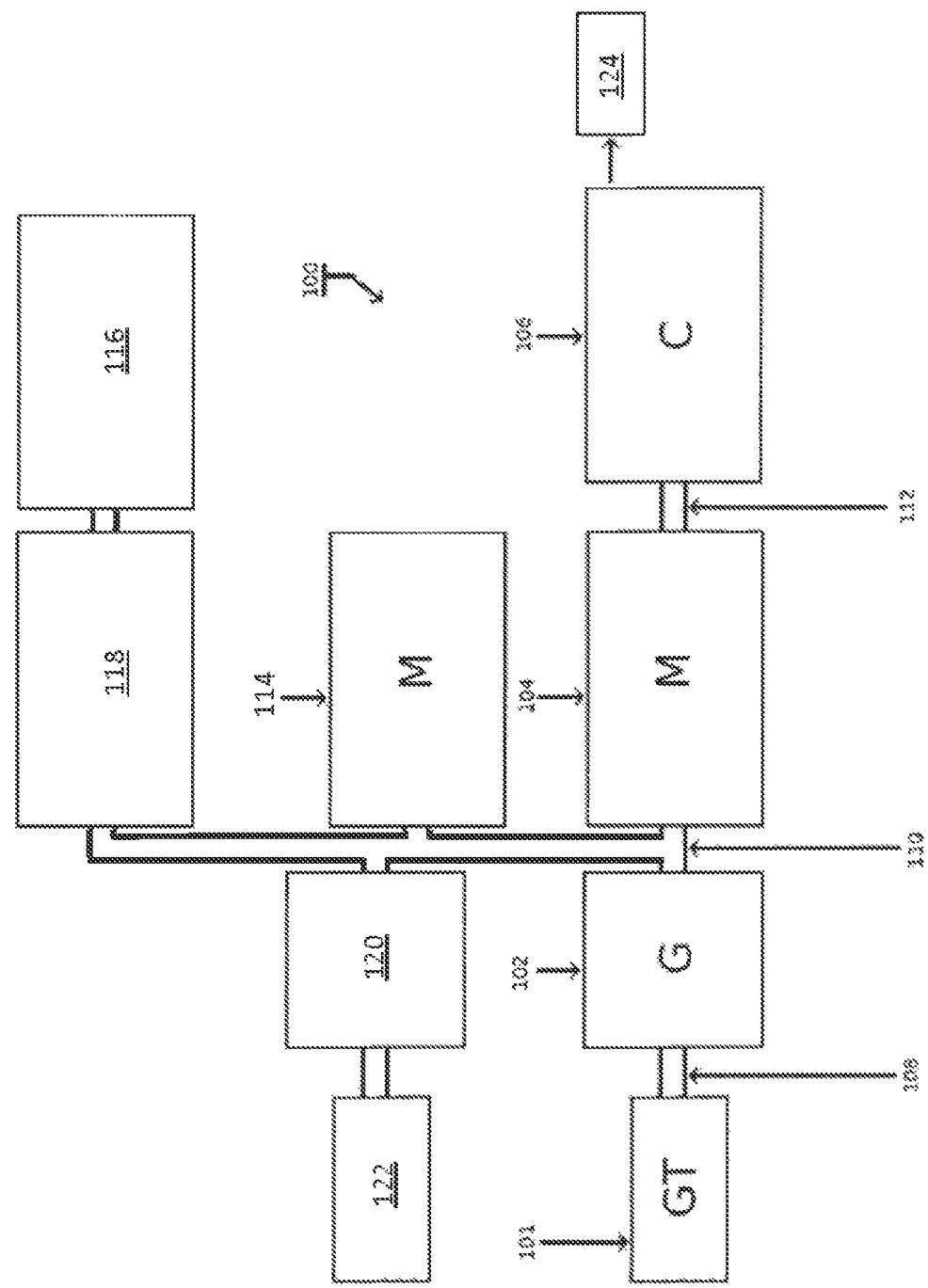

ADVANCED TOPOLOGIES FOR OFFSHORE POWER SYSTEMS

The present application is a national stage application of PCT Pat. App. No. PCT/US2011/022730, filed Jan. 27, 2011, which claims priority to U.S. Patent Application Ser. No. 61/298,624, which was filed Jan. 27, 2010. These priority applications are hereby incorporated by reference in their entirety into the present application.

BACKGROUND

The present disclosure relates to a power distribution arrangement capable of supplying high frequency power, which is generally defined as power at frequencies above the standard 60 Hz, directly to high frequency motors, which may be located remotely from the power generation source.

Conventional high frequency motors have used a plurality of different methods to receive high frequency power, however, each of the conventional methods have employed some sort of power conversion. For example, the US Navy's Next Generation Integrated Power System (a primary user of high frequency power) utilizes high frequency generation, which then is converted to DC or low frequency for transmission/distribution to the end user (high frequency motor). Other configurations use a variable frequency drive (VFD) to convert the standard low frequency energy up to the desired high frequency for use with an associated high frequency electric motor. A VFD or adjustable frequency drive (as they are sometimes known) generally includes a system or controller capable of adjusting the rotational speed of an AC motor by controlling the frequency of the electrical power supplied to the motor, as the frequency, number of poles in the stator winding, and the rotational speed of the motor are known to be directly related.

However, each of the conventional methods for driving high frequency motors suffers from several disadvantages, including the increased size and weight associated with the converters and related equipment, which is critical in markets where weight and space are limited, such as in the offshore market. Additionally, reliability and maintenance issues that inherently accompany a system with multiple components (converters, controllers, operator interfaces, etc.), such as the above noted conventional VFD-type high frequency motor driver system, are disadvantageous.

Therefore, a high frequency motor drive system that overcomes one or more of the conventional disadvantages is desired. More particularly, a system that would enable the use of high power, high speed motors without the need for high power, high voltage solid state conversion systems is desirable.

SUMMARY

Embodiments of the present disclosure may provide an offshore high frequency power generation and compression system that does not use a variable frequency drive or other power conversion devices to control the speed of a high speed high frequency motor driving a centrifugal compressor.

Embodiments of the disclosure may further provide a variable speed compression system that is driven by a variable frequency high speed motor that receives power from a high frequency generation unit that is driven by a high speed gas turbine. Additionally the speed of the turbine may be varied to control the output frequency of the high frequency generation unit, thus controlling the output of the compression system by controlling the speed of the turbine driving the generation unit.

Embodiments of the disclosure may further provide an integrated compression system (a centrifugal compressor and fluid separation unit on a common shaft that is driven by multi-pole high speed high frequency electrical motor) that receives power from multiple pole generator being driven by a variable speed gas turbine. As the output shaft speed of the turbine varies, the output voltage and frequency of the generator are varied, which varies (proportionally) the output shaft rotational speed of the electric motor driving the integrated compression system.

BRIEF DESCRIPTION OF THE DRAWINGS

The present disclosure is best understood from the following detailed description when read with the accompanying FIGURE. It is emphasized that, in accordance with the standard practice in the industry, various features are not drawn to scale. In fact, the dimensions of the various features may be arbitrarily increased or reduced for clarity of discussion.

FIG. 1 illustrates a schematic view of an exemplary variable speed high frequency motor driver of the present disclosure.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated.

Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Embodiments of the present disclosure allow for the use of high speed motors operating above line or standard frequency (generally 60 Hz=line frequency) without the need for variable frequency drives, controllers, and other associated frequency conversion components. High frequency (variable) power may be generated and distributed directly to high speed electric motors configured to directly drive process equipment, such as compression equipment in an offshore application, without any conversion and without the use of a variable frequency drive or related components.

FIG. 1 illustrates a schematic view of an exemplary variable speed high frequency motor driver system 100 of the present disclosure. System 100 may generally include a load device 106, which may be any device or system configured to receive rotational power or work. In the present disclosure the inventors contemplate that the load device 106 may be a piece of rotating equipment, such as a centrifugal compressor. Exemplary centrifugal compressors are manufactured by Dresser-Rand Co. of Olean, N.Y. under the Datum brand name. The load device 106 is connected to a high frequency high power electric motor 104 via a connection 112. The connection 112 generally includes a shaft or other means of directly coupling (same rotation speed) the load device 106 to a high frequency variable speed electric motor 104.

The electric motor 104 is in electrical communication with a source of electrical power 102, which in the present disclosure may generally be a multi-pole (at least 4) generator 102 configured to receive rotational power or work and convert the power/work into a high frequency electrical power that can be received and used by the electric motor 104 to generate rotational power to be delivered to the load device 106. The multi-pole generator 102 may generally be configured to generate a variable frequency output of electrical power, where the output frequency of the electrical power is directly dependent upon the rotation speed of the generator 102. The generator 102 is electrically coupled to the electric motor 104 via electrical connections 110, which may represent electrical wires, transmission lines, electrical buses, or other means of communicating electrical power from a power source to an electrical motor.

The multi-pole generator 102 is generally driven by a source of rotational power 101. The source of rotational power 101 is generally a non-electrical device, and may include, for example, a variable speed gas turbine 101. Although the variable speed gas turbine is a primary focus of the present disclosure, the inventors contemplate that alternative sources of variable high speed rotational power may also be used in alternative embodiments of the disclosure. The key to the gas turbine 101 is the high power, high rotation speed, variable power that it is capable of delivering to support efficient operation of the high speed high frequency motor 104 and the associated compressor 106.

Variable speed operation of process equipment (load devices such as the compressor 106) using embodiments of the present disclosure may be achieved by changing the speed of a driving source (gas turbine 101) of the high frequency power generation unit 102 (generally a multi-pole generator having at least four poles), such as a power turbine connected to the high frequency generator 102. For example, in the situation where a variable speed turbine 1-1 is used to drive a high frequency electrical generator 102 that supplies power to a high frequency variable speed motor 104 driving a compressor 106 or other speed sensitive equipment, the output pressure, flow, or power of the compressor/speed sensitive equipment can be varied by varying the operation or output shaft speed of the turbine 101 driving the high frequency generator 102. As the turbine speed is decreased, the output frequency of the high frequency generator 102 proportionally decreases, and when the frequency of the supply power to the high frequency motor decreases the output shaft rotational speed of the motor proportionally decreases.

In an exemplary embodiment, the high frequency power and load system provided in the present disclosure may be used to drive an integrated compression system (ICS~a system with an integrated compressor and fluid separation apparatuses), such as that which is provided by Dresser-Rand Company of Olean, N.Y., that is positioned on an offshore petroleum production facility, such as a pre-salt FPSO (further discussed herein).

In another embodiment of the present disclosure, the high frequency power generation system (the turbine and high frequency power generator) and the high frequency motor and speed sensitive equipment (a compressor or other output equipment) may be positioned at the same location. For example, in an offshore petroleum production or processing facility, such as a floating offshore oil production and system offloader facility (FPSO), where high frequency motors are commonly used to treat, process, and facilitate transport of oil, the system of the present disclosure could be advantageously used. More particularly, the power generation unit a (turbine and generator) and the motor/driven equipment package (motor and compressor) could both be positioned on an offshore rig, platform, or FBSO. Thus, the (variable) high frequency power generated by the turbine/generator can be directly transferred to the high frequency motor to control the operation thereof. In other embodiments, the high frequency power can be generated remotely and transmitted to the rig or platform in similar fashion to conventional power distribution systems. However, regardless of the configuration, when the high frequency system of the present disclosure is implemented, the balance of electrical loads in the system, i.e., the standard 60 Hz systems, may still be served by either by a DC system or with smaller conventional conversion equipment.

In one exemplary embodiment of the present disclosure, turbines and generators may be used to implement high frequency system. For example, high frequency power (generally over 100 Hz, and often times over 200 Hz) may be produced by a high frequency electrical generator that may be directly coupled to a gas turbine driver with a fixed or variable speed power turbine, such as a VECTRA 40G HS (Vectra 40G C-W), which is manufactured and sold by Dresser-Rand Company of Olean, N.Y. In this embodiment, a multi-pole generator, which would generally include at least four poles, operating at the turbine speed may be used to allow the motor to operate at a speed determined by the ratio of the generator poles to the motor poles, and the input rotational speed of the generator may be controlled or varied by adjusting the output of the gas turbine.

In another exemplary embodiment of the present disclosure, high frequency power may be generated by multiple variable speed gas turbine driven generators 102, 120 with all generators 102, 120 feeding a single electrical distribution bus 110. High frequency power from the distribution bus 110 may be distributed directly to a plurality of high speed motors 104, 114, which directly drive process equipment loads. The variable speed capability of the power turbines 101, 122 driving the generators 102, 120 allow for variable speed operation of the process driven equipment without need for conversion technology or variable frequency drives. Balance of plant loads are served by rectifying a portion of the high frequency power to DC and then distributing the DC to the various load centers, for use directly by DC systems, or up-converted to AC at standard line frequency for conventional 60 or 50 Hz loads, by conventional mature conversion technology.

The exemplary configurations described herein provide a clear and significant reduction in the size and weight of the generation equipment due to the reduction in required components. Specifically, in conventional system each of the high speed motors required a VFD system, which requires substantial space (tens of square feet of footprint of hundreds of cubic feet of total volume for even smaller units) and has significant weight (hundreds of pounds for even smaller units). Additionally, an increased power density is provided by the high frequency generation system that is not available through conventional power systems. Further still, a system consistent with the present disclosure also provides significant reduction in the motor and driver equipment size and weight and inherently increases the reliability of the system due at least in part to the elimination of the variable frequency drive unit components that are prone to failure in harsh environments, such as FPSO implementations. These size and weight reductions over conventional systems make the present disclosure appealing to all types of offshore petroleum production facilities.

Another exemplary embodiment of the disclosure may provide a power distribution system, that includes a first high frequency load device that directly receives a high frequency alternating current electrical power at a variable frequency and a variable voltage; a first high frequency generator that generates the high frequency AC electrical power, the high frequency generator directly supplying the first high frequency load device with the high frequency alternating current electrical power at the variable frequency and the variable voltage; and a first variable speed turbine that drives the first high frequency generator.

In another embodiment the first high frequency load device may be a variable speed motor driving a piece of process equipment.

In another embodiment the system may further include a compressor that is driven by the variable speed motor, and the high frequency generator have a plurality of generator poles and the variable speed motor may have one or more motor poles, so that the speed of the variable speed motor may be controlled by the speed of a variable speed turbine driving the first high frequency generator and the ratio of the generator poles to the motor poles.

In yet another embodiment the system may further include a bus electrically coupled between the first high frequency generator and the first high frequency load device and through which the first high frequency generator directly supplies the high frequency load device with the high frequency alternating current power at the variable frequency and the variable voltage.

In yet another embodiment the system may further include a second high frequency load device electrically coupled to the bus, the second load device directly receiving the high frequency AC electrical power at the variable frequency and the variable voltage through the bus.

In yet another embodiment the system may further include a low frequency load device 116 electrically coupled to the bus 110; and a converter 118 electrically coupled between the bus 110 and the low frequency load device 116.

In yet another embodiment the system may further include a second high frequency generator 120 electrically coupled to the bus 110; and a second variable speed turbine 122 that drives the second high frequency generator 120.

In another exemplary embodiment, the system of the present disclosure may be configured to provide power rectification, DC distribution, and local load center conversion to AC power for BOP electrical loads.

In another exemplary embodiment, the system of the present disclosure may be configured for use in subsea applications where subsea VFD installation would be avoided when step-out distances for the motor high voltage supply are prohibitive.

In another embodiment of the disclosure, a power distribution system is provided. The system may include a variable speed gas turbine having an output shaft, a multi-pole high frequency electrical power generator connected to the output shaft and receiving rotational power therefrom, a high speed variable frequency electric motor electrically connected to an output of the multi-pole high frequency electrical power generator, and a variable speed centrifugal compressor having a central rotor, the central rotor being coupled to an output shaft of the high speed variable frequency electric motor for concomitant rotation therewith. The power distribution system may further include an electrical bus electrically coupled between the multi-pole high frequency electrical power generator and the high speed variable frequency electric motor, and/or one or more additional high speed variable frequency electric motors electrically coupled to the electrical bus, the one or more additional high speed variable frequency electric motors directly receiving high frequency alternating current at a variable frequency and a variable voltage through the electrical bus, and/or a low frequency electrical motor or other load device electrically coupled to the bus along with a converter electrically coupled between the bus and the low frequency load device to convert the high frequency electrical power into low frequency power to be used by the low frequency electrical motor or other load device. The exemplary system may further include a second high frequency generator electrically coupled to the bus along with a second variable speed turbine that drives the second high frequency generator, and the system may be configured to provide power rectification, DC distribution, and local load center conversion to AC power for BOP electrical loads.

In another embodiment of the disclosure, a method for controlling compression of a gas may be provided. The method may include controlling an output shaft speed of a gas turbine 101 connected to a multi-pole high frequency electrical power generator 102 to generate a controlled variable frequency and voltage electrical current, receiving the variable frequency and voltage electrical current in a high speed variable frequency electric motor 104 electrically connected to an output of the multi-pole high frequency electrical power generator 102, and causing the high speed variable frequency electric motor 104 to rotate at varied speeds or power outputs, and receiving rotational power from the high speed variable frequency electric motor 104 in a centrifugal compressor 106, the varied speeds and power outputs thereby controlling compression of a gas traveling through the centrifugal compressor 106. The method may further include the output shaft speed of the gas turbine 101 being increased if gas compression by the centrifugal compressor 106 is desired to increase, and/or increasing/decreasing the output shaft speed of the gas turbine 101 directly increases/decreases compression in the centrifugal compressor 106. The method may further include the multi-pole high frequency electrical power generator 102 having at least four poles, and/or controlling the output shaft speed of the turbine 101 is electronically executed via sensors 124 on the output of the centrifugal compressor 106 that indicate pressure, the sensors 124 communicating with an electronic controller that receives sensor information and sends control signals to the turbine 101 to adjust the output shaft speed of the turbine 101 to generate the desired compression pressure at the output of the centrifugal compressor 106. Additionally, the method may include packaging the turbine, generator, and compressor in a single lift frame, and/or using a microprocessor-based controller in communication with a plurality of sensors associated with the compressor and a mechanical or electrical mechanism associated with the turbine to control the system, wherein the sensors feed compression data to the controller, which then generates control signals that are transmitted to the mechanism associated with the turbine to change the output shaft speed of the turbine.

In another embodiment of the disclosure, a system for controlling a centrifugal compressor may be provided. The system may include a variable speed gas turbine, a multi-pole high frequency electrical power generator receiving rotational driving power from the variable speed gas turbine, a high speed variable frequency electric motor electrically receiving electrical power from the multi-pole high frequency electrical power generator, a variable speed centrifugal compressor directly driven by the high speed variable frequency electrical motor, and an electronic controller configured to increase/decrease an operating speed of the variable speed as turbine to control an output of the centrifugal compressor. The system may further include an electrical bus electrically coupled between the multi-pole high frequency electrical power generator and the high speed variable frequency electric motor, and/or one or more additional high speed variable frequency electric motors electrically coupled to the electrical bus, the one or more additional high speed variable frequency electric motors directly receiving high frequency alternating current at a variable frequency and a variable voltage through the electrical bus. The system may further include a low frequency electrical motor or other load device electrically coupled to the bus along with a converter electrically coupled between the bus and the low frequency load device to convert the high frequency electrical power into low frequency power to be used by the low frequency electrical motor or other load device, and/or a second high frequency generator electrically coupled to the bus along with a second variable speed turbine that drives the second high frequency generator. The system may also include an embodiment where an output shaft of the variable speed gas turbine is directly coupled to an input shaft of the a multi-pole high frequency electrical power generator and wherein an output shaft of the a high speed variable frequency electric motor is directly coupled to an input shaft of the variable speed centrifugal compressor directly driven by the high speed variable frequency electrical motor.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A power distribution system, comprising:
a variable speed gas turbine having an output shaft;
a multi-pole high frequency electrical power generator directly coupled to the output shaft and receiving rotational power therefrom, the multi-pole high frequency electrical power generator rotating at the same speed as the output shaft speed of the gas turbine;
a high speed variable frequency electric motor electrically connected to an output of the multi-pole high frequency electrical power generator; and
a variable speed centrifugal compressor having a central rotor, the central rotor being coupled to an output shaft of the high speed variable frequency electric motor for concomitant rotation therewith, the power distribution system being configured to provide power rectification, DC distribution, and local load center conversion to AC power for Balance of Plant (BOP) electrical loads.

2. The power distribution system of claim 1, further comprising an electrical bus electrically coupled between the multi-pole high frequency electrical power generator and the high speed variable frequency electric motor.

3. The power distribution system of claim 2, further comprising one or more additional high speed variable frequency electric motors electrically coupled to the electrical bus, the one or more additional high speed variable frequency electric motors directly receiving high frequency alternating current at a variable frequency and a variable voltage through the electrical bus.

4. The power distribution system of claim 2, further comprising:
a low frequency electrical motor or other load device electrically coupled to the bus; and
a converter electrically coupled between the bus and the low frequency load device to convert the high frequency electrical power into low frequency power to be used by the low frequency electrical motor or other load device.

5. The power distribution system of claim 2, further comprising:
a second high frequency generator electrically coupled to the bus; and
a second variable speed turbine that drives the second high frequency generator.

6. A method for controlling compression of a gas, comprising:
controlling an output shaft speed of a gas turbine directly coupled to a multi-pole high frequency electrical power generator to generate a controlled variable frequency and voltage electrical current, the multi-pole high frequency electrical power generator being configured to rotate at the same speed as the output shaft speed of the gas turbine;
receiving the variable frequency and voltage electrical current in a high speed variable frequency electric motor electrically connected to an output of the multi-pole high frequency electrical power generator, and causing the high speed variable frequency electric motor to rotate at varied speeds or power outputs; and
receiving rotational power from the high speed variable frequency electric motor in a centrifugal compressor, the varied speeds and power outputs thereby controlling compression of a gas traveling through the centrifugal compressor such that increasing/decreasing the output shaft speed of the gas turbine increases/decreases compression in the centrifugal compressor, wherein information related to the compression of the gas in the centrifugal compressor controls the output shaft speed of the gas turbine.

7. The method of claim 6, wherein the output shaft speed of the gas turbine is increased if gas compression by the centrifugal compressor is desired to increase.

8. The method of claim 6, wherein the multi-pole high frequency electrical power generator has at least four poles.

9. The method of claim 6, wherein controlling the output shaft speed of the gas turbine is electronically executed via sensors on the output of the centrifugal compressor.

10. A system for controlling a centrifugal compressor, comprising:
a variable speed gas turbine;
a multi-pole high frequency electrical power generator directly coupled to the variable speed gas turbine and configured to receive rotational driving power from the variable speed gas turbine and rotate at the same speed as the variable speed gas turbine;
a primary high speed variable frequency electric motor electrically receiving electrical power from the multi-pole high frequency electrical power generator;
an electrical bus electrically coupled between the multi-pole high frequency electrical power generator and the primary high speed variable frequency electric motor;
one or more secondary high speed variable frequency electric motors electrically coupled to the electrical bus, the one or more secondary high speed variable frequency electric motors directly receiving high frequency alternating current at a variable frequency and a variable voltage through the electrical bus; and
a variable speed centrifugal compressor directly driven by the primary high speed variable frequency electrical motor.

11. The system of claim 10, further comprising:
a low frequency electrical motor or other load device electrically coupled to the bus; and
a converter electrically coupled between the bus and the low frequency load device to convert the high frequency electrical power into low frequency power to be used by the low frequency electrical motor or other load device.

12. The system of claim 10, further comprising:
a second high frequency generator electrically coupled to the bus; and
a second variable speed turbine that drives the second high frequency generator.

13. The system of claim 10, wherein an output shaft of the variable speed gas turbine is directly coupled to an input shaft of the multi-pole high frequency electrical power generator and wherein an output shaft of the primary high speed variable frequency electric motor is directly coupled to an input shaft of the variable speed centrifugal compressor directly driven by the primary high speed variable frequency electrical motor.

* * * * *